United States Patent
Kim et al.

(10) Patent No.: US 9,154,766 B2
(45) Date of Patent: *Oct. 6, 2015

(54) METHOD FOR OUTPUTTING THREE-DIMENSIONAL (3D) IMAGE AT INCREASED OUTPUT FREQUENCY AND DISPLAY APPARATUS THEREOF

(75) Inventors: Ji-won Kim, Seoul (KR); Kyung-hwan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

This patent is subject to a terminal disclaimer.

(21) Appl. No.: 13/447,553

(22) Filed: Apr. 16, 2012

(65) Prior Publication Data

US 2013/0044102 A1    Feb. 21, 2013

(30) Foreign Application Priority Data

Aug. 16, 2011    (KR) .................. 10-2011-0081340

(51) Int. Cl.
*H04N 13/04*    (2006.01)
*H04N 13/00*    (2006.01)
*G09G 3/00*    (2006.01)

(52) U.S. Cl.
CPC .......... *H04N 13/0029* (2013.01); *G09G 3/003* (2013.01); *H04N 13/0033* (2013.01); *H04N 13/0438* (2013.01); *H04N 13/0497* (2013.01); *G09G 2340/0407* (2013.01)

(58) Field of Classification Search
CPC .......... G09G 2320/0209; H04N 13/02; H04N 13/0203; H04N 13/0275; H04N 13/0018; H04N 13/0007; H04N 13/0029; H04N 13/0033; H04N 13/0436; H04N 13/0438; H04N 13/0497

USPC .................. 345/419, 211, 633; 348/241, 242, 348/E5.024, E5.031, E9.042, 222.1, 607, 348/E11.021, E5.022, E5.078, E9.051, 348/E9.053, 159, 208.4, 223.1, 243, 246, 348/251, 256, 273, 453, 54, 645

See application file for complete search history.

(56) References Cited

U.S. PATENT DOCUMENTS 4,523,226 A  *  6/1985  Lipton et al. .................... 348/49
6,674,484 B1 *  1/2004  Boland et al. ................. 348/580

(Continued)

FOREIGN PATENT DOCUMENTS

| EP | 2337362 A2 | 6/2011 |
|---|---|---|
| JP | 4742174 B1 | 8/2011 |
| KR | 10-2008-0064514 A | 7/2008 |

(Continued)

OTHER PUBLICATIONS

Communication, dated Jul. 2, 2014, issued by the European Patent Office in counterpart Patent Application No. 12161315.2.

(Continued)

*Primary Examiner* — Zhengxi Liu
(74) *Attorney, Agent, or Firm* — Sughrue Mion, PLLC

(57) ABSTRACT

A method for outputting a 3D image and a display apparatus using the same are provided. The method for outputting a 3D image includes generating a left eye image and a right eye image using an input image, decreasing resolution of the left eye image and the right eye image by a predetermined positive number of times and outputting the left eye image and the right eye image by increasing an output frequency by the positive number of times. Accordingly, a 60 Hz timing controller used for a general display apparatus may be used and thus, a flickering effect and a cross-talk effect may be prevented.

12 Claims, 6 Drawing Sheets

(56) References Cited

U.S. PATENT DOCUMENTS

| | | | |
|---|---|---|---|
| 7,129,987 B1* | 10/2006 | Westwater | 348/441 |
| 2007/0097024 A1* | 5/2007 | Jung et al. | 345/32 |
| 2009/0128620 A1* | 5/2009 | Lipton et al. | 348/42 |
| 2010/0033555 A1* | 2/2010 | Nagase et al. | 348/43 |
| 2010/0253678 A1 | 10/2010 | Choi et al. | |
| 2013/0002838 A1 | 1/2013 | Takenaka | |

FOREIGN PATENT DOCUMENTS

WO    8302706 A1    8/1983

OTHER PUBLICATIONS

Communication issued on May 11, 2015 by the State Intellectual Property Office of PR China in related Application No. 201210292339.4.

* cited by examiner

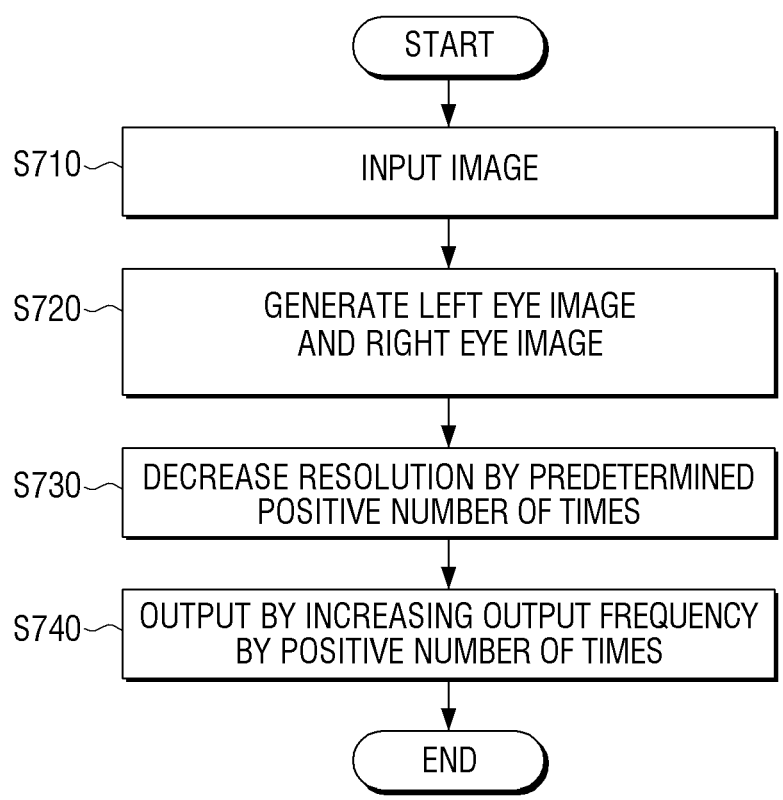

METHOD FOR OUTPUTTING THREE-DIMENSIONAL (3D) IMAGE AT INCREASED OUTPUT FREQUENCY AND DISPLAY APPARATUS THEREOF

CROSS-REFERENCE TO RELATED APPLICATIONS

This application claims priority from Korean Patent Application No. 2011-0081340, filed Aug. 16, 2011, in the Korean Intellectual Property Office, the disclosure of which is incorporated herein by reference in its entirety.

BACKGROUND

1. Field

Methods and apparatuses consistent with exemplary embodiments herein relate to a method for outputting a three-dimensional (3D) image and a display apparatus using the same, and more particularly, to a method for outputting a 3D image which generates a left eye image and a right eye image using an input image, and outputs the generated left eye image and right eye image alternately, and a display apparatus using the same.

2. Description of the Related Art

A 3D stereoscopic image technology is applicable to various fields such as information communication, broadcasting, medicine, education & training, military, games, animation, virtual reality, Computer Aided Design (CAD), and industrial technology, and is regarded as a core base technology for the next generation 3D stereoscopic multimedia information communication, which is required in all the aforementioned fields.

Generally, a stereoscopic sense that a person perceives occurs from a complex effect of the degree of change of thickness of the person's eye lens according to the location of an object to be observed, the angle difference of the object observed from both eyes, the differences of location and shape of the object observed from both eyes, the time difference due to movement of the object, and other various psychological and memory effects.

In particular, binocular disparity, caused by about a 6~7 cm lateral distance between the person's left eye and right eye, can be regarded as the main cause of the stereoscopic sense. Due to binocular disparity, the person perceives the object with an angle difference, which makes the left eye and the right eye receive different images, and when these two images are transmitted to the person's brain through retinas, the brain can perceive the original 3D stereoscopic image by combining the two pieces of information exactly.

There are two types of stereoscopic image display apparatuses: glasses-type apparatuses which use special glasses, and nonglasses-type apparatuses which do not use such special glasses. A glasses-type apparatus may adopt a color filtering method which separately selects images by filtering colors which are in mutually complementary relationships, a polarized filtering method which separates the images received by a left eye from those received by a right eye using a light-shading effect caused by a combination of polarized light elements meeting at right angles, or a shutter glasses method which enables a person to perceive a stereoscopic sense by blocking a left eye and a right eye alternately in response to a sync signal which projects a left eye image signal and a right eye image signal to a screen.

A 3D image comprises a left eye image perceived by a left eye and a right eye image perceived by a right eye. A 3D image display apparatus displays the stereoscopic sense of a 3D image by displaying a left eye image and a right eye image alternately.

Meanwhile, a related art 3D display apparatus processes a left eye image and a right eye image in resolution of 1920*1080 into a left eye image in resolution of 1920*540 and a black image and a right eye image in resolution of 1920*540 and a black image respectively, and inserts a black image between the left eye image and the right eye image before outputting the images, as illustrated in FIG. 1. That is, a related art display apparatus outputs images in the order of a left eye image L1->a black image->a right eye image R1->a black image->a left eye image L2->. . . . In this case, a related art display apparatus uses a 120 Hz timing controller to have a left eye image L1 and a left eye image L2 be displayed at an interval of 60 Hz.

A related art display apparatus according to FIG. 1 may reduce a cross-talk effect where a left eye image and a right eye image appear to be overlapped with each other and may also reduce a flickering effect when the interval between a left eye image and the next left eye image becomes 60 Hz. However, in order to display a left eye image L1 and the next left eye image L2 at an interval of 60 Hz, a 120 Hz timing controller should be used instead of a 60 Hz timing controller which is generally used, making the system complicated.

In addition, another related art display apparatus outputs a left eye image and a right eye image in resolution of 1920*1080 at an interval of 60 Hz without adjusting the size of the left eye image and the right eye image in resolution of 1920*1080, as illustrated in FIG. 1. That is, a related art display apparatus according to FIG. 2 outputs images in the order of a left eye image L1->a right eye image R1->a left eye image L2->a right eye image R2.

The related art display apparatus according to FIG. 2 may use a 60 Hz timing controller, but a flickering effect may occur as the interval between a left eye image L1 and the next left eye image L2 is 30 Hz.

Accordingly, a method for outputting a 3D image using a 60 Hz timing controller which is used in a general display apparatus without causing a flickering effect is required.

SUMMARY

An aspect of the exemplary embodiments relates to a method for outputting a 3D image in which the resolution of a left eye image and a right eye image is decreased by a predetermined positive number of times and the output frequency of a left eye image and a right eye image is increased by a predetermined positive number of times and a display apparatus thereof.

A method for outputting a 3D image in a display apparatus, according to an exemplary embodiment, includes generating a left eye image and a right eye image, decreasing resolution of the left eye image and the right eye image by a predetermined positive number of times, and outputting the left eye image and the right eye image by increasing an output frequency by the positive number of times.

The outputting may include outputting pixel data of each line constituting the left eye image and the right eye image to a positive number of lines simultaneously.

The positive number of lines may be 2.

The resolution of the left eye image and the right eye image may be 1920*1080 and an input frequency may be 60 Hz, the decreasing may include decreasing resolution of the left eye image and the right eye image to 1920*540, and the outputting may include outputting the left eye image and the right eye image at an output frequency of 120 Hz and outputting pixel data of each line constituting the left eye image and the right eye image to two lines simultaneously.

The method may further include generating a sync signal of 120 Hz and transmitting the sync signal to 3D glasses interlocked with the display apparatus.

The outputting may include dividing an image output unit outputting the left eye image and the right eye image into a plurality of blocks and outputting the plurality of blocks sequentially at every frame of the left eye image and the right eye image.

A display apparatus, according to an exemplary embodiment, includes an image input unit which receives an image, an image processing unit which generates a left eye image and a right eye image using the input image, an image output unit which outputs the generated left eye image and the generated right eye image alternately, and a control unit which controls to output the left eye image and the right eye image by decreasing resolution of the left eye image and the right eye image by a predetermined positive number of times and increasing an output frequency of the left eye image and the right eye image by the positive number of times.

The control unit may control the image output unit to output pixel data of each line constituting the left eye image and the right eye image to the positive number of lines simultaneously.

The positive number of lines may be 2.

The resolution of the left eye image and the right eye image may be 1920*1080 and an input frequency is 60 Hz, and the control unit may control the image output unit to decrease resolution of the left eye image and the right eye image to 1920*540, to output the left eye image and the right eye image at an output frequency of 120 Hz, and to output pixel data of each line constituting the left eye image and the right eye image to two lines simultaneously.

The display apparatus may further include a sync signal generating unit which generates a sync signal of 120 Hz to synchronize with 3D glasses interlocked with the display apparatus and a communication unit which transmits the generated sync signal to the 3D glasses.

The control unit may control the image output unit to divide an image output unit into a plurality of blocks and output the plurality of blocks sequentially at every frame of the left eye image and the right eye image

BRIEF DESCRIPTION OF THE DRAWINGS

The above and/or other aspects will be more apparent by describing exemplary embodiments with reference to the accompanying drawings, in which:

FIG. 7 is a flowchart to explain a method for outputting a 3D image of a display apparatus according to an exemplary embodiment.

DETAILED DESCRIPTION

Figure 1:
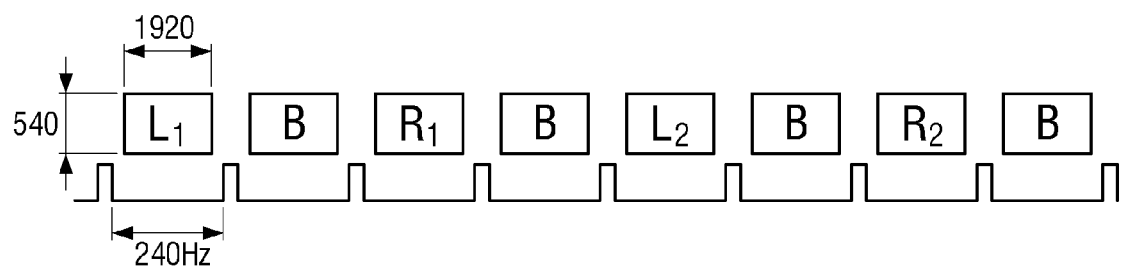
FIGS. 1 and 2 are output timing diagrams of a left eye image and a right eye image of a related art 3D display apparatus.
Figure 2:
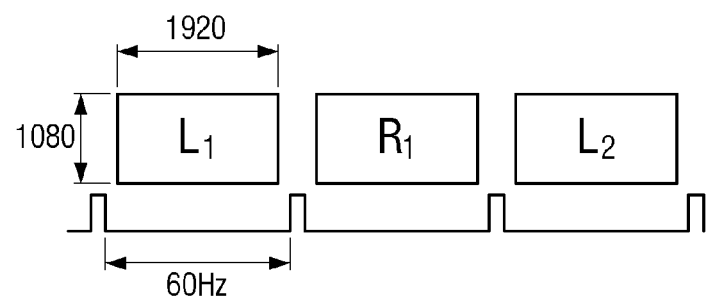

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 3:
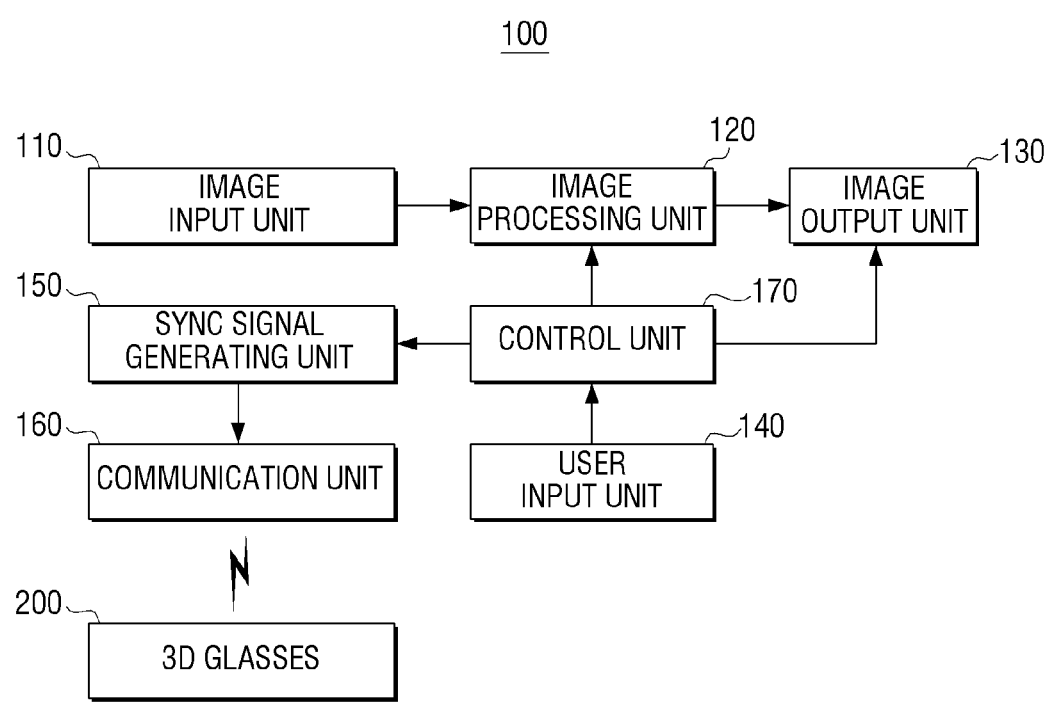
FIG. 3 is a block diagram of a display apparatus according to an exemplary embodiment.

FIG. 3 is a block diagram of a display apparatus 100 according to an exemplary embodiment. As illustrated in FIG. 3, the display apparatus 100 includes an image input unit 110, an image processing unit 120, an image output unit 130, a user input unit 140, a sync signal generating unit 150, a communication unit 160, and a control unit 170. In this case, the display apparatus 100 is a display apparatus which displays an image stereoscopically by displaying a left eye image and a right image alternately and may include a 3D television, a 3D projector, and a 3D monitor, but is not limited thereto.

The image input unit 110 receives image data from an external apparatus (for example, a DVD player) or a broadcasting station via cable or wirelessly. In this case, the received image data may be two-dimensional (2D) image data or 3D image data. In addition, the received image data is 3D image data in various formats, such as 3D image data using a top & bottom method, a side by side method, a horizontal interleaved method, a vertical interleaved method, a checker board method, a frame sequential method, a field sequential method, and a frame packing method.

The image processing unit 120 performs signal processing such as video decoding and video scaling with respect to image data input by the image input unit 110.

In addition, the image processing unit 120 generates a left eye image and a right eye image using image data input under the control of the control unit 170. Specifically, if input image data is 2D image data, the image processing unit 120 may generate a left eye image and a right eye image using the input 2D image. Alternatively, if input image data is 3D image data, the image processing unit 120 may generate a left eye image and a right eye image according to various formats. This will be explained later with reference to FIGS. 4A to 4C.

In addition, the image processing unit 120 decreases resolution of a left eye image and a right eye image by a predetermined positive number of times. In this case, the predetermined positive number of times may be two times. For example, if the resolution of a generated right eye image and a generated left eye image is 1920*1080, the image processing unit 120 may reduce the resolution of the generated right eye image and the generated left eye image to 1920*540.

The image processing by the image processing unit 120 when 3D image data in various formats is input will be explained with reference to FIGS. 4A to 4C.

Figure 4A:
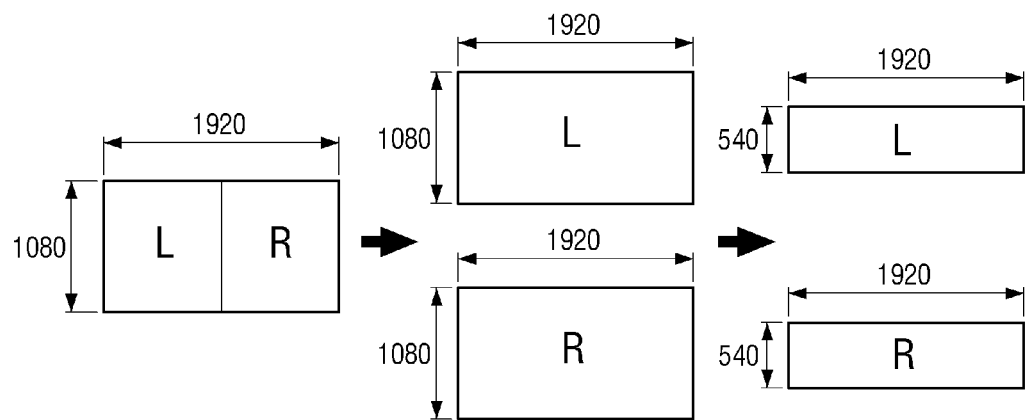
FIGS. 4A to 4C are views to explain how to process a 3D image in various formats according to an exemplary embodiment.

As illustrated in FIG. 4A, if input image data is 3D image data of a left and right division method in resolution of 1920*1080, the image processing unit 120 divides the 3D image data of the left and right division method into a left eye image and a right eye image and performs scaling of the left and right size of the divided left eye image and the right eye image to generate a left eye image and a right eye image having resolution of 1920*1080. In addition, the image processing unit 120 processes the generated left eye image and the generated right eye image so that the resolution of the generated left eye image and the generated right eye image becomes half of 1920*1080, that is, 1920*540.

Figure 4B:
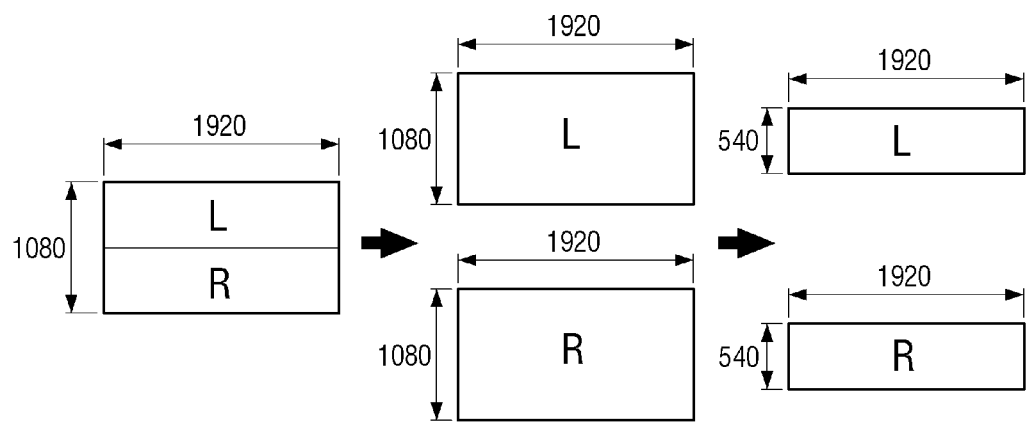

In another exemplary embodiment, as illustrated in FIG. 4B, if input image data is 3D image data of a top and bottom division method in resolution of 1920*1080, the image processing unit 120 divides the 3D image data of the top and bottom division method into a left eye image and a right eye image and performs scaling of the top and bottom size of the divided left eye image and the right eye image to generate a left eye image and a right eye image having resolution of 1920*1080. In addition, the image processing unit 120 processes the generated left eye image and the generated right eye image so that the resolution of the generated left eye image and the generated right eye image becomes half of 1920*1080, that is, 1920*540.

Figure 4C:
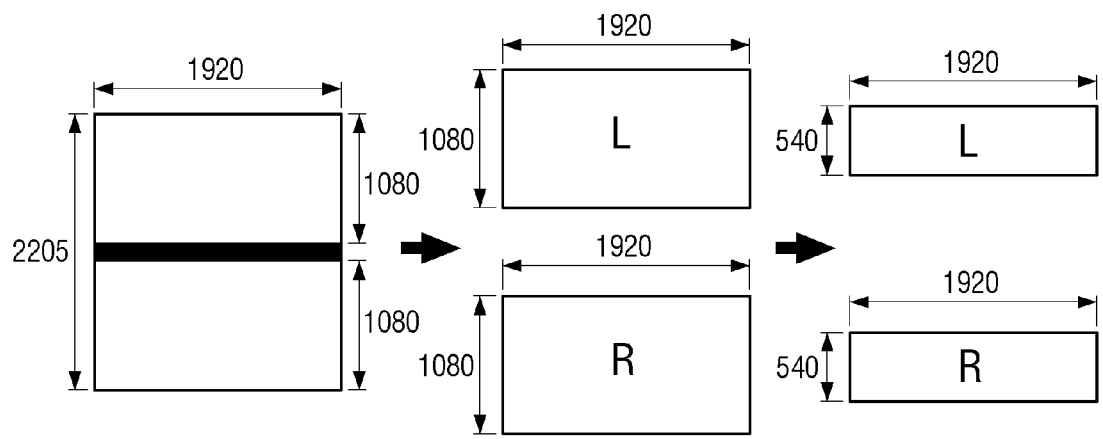

In another exemplary embodiment, as illustrated in FIG. 4C, if input image data is 3D image data of a frame packing method in resolution of 1920*2205, the image processing unit 120 divides the 3D image data of the frame packing method into a left eye image and a right eye image to generate a left eye image and a right eye image having resolution of 1920*1080. In addition, the image processing unit 120 processes the generated left eye image and the generated right eye image so that the resolution of the generated left eye image and the generated right eye image becomes half of 1920*1080, that is, 1920*540.

In the above description regarding FIGS. 4A to 4C, only the top and bottom division method, the left and right division method and the frame packing method have been explained, but they are only examples. The exemplary embodiments may be applied to a 3D image or a 2D image having other formats than those illustrated in FIGS. 4A to 4C.

The image output unit 130 outputs left eye images and right eye images processed by the image processing unit 120 alternately. In particular, the image output unit 130 increases output frequencies of left eye images and right eye images by a positive number of times before outputting them, under the control of the control unit 170.

Specifically, if resolution of a left eye image and a right eye image is decreased by two times by the image processing unit 120, the image output unit 130 increases an output frequency of the left eye image and the right eye image by two times before outputting them. For example, if a frequency of an input left eye image and an input right eye image is 60 Hz, the image output unit 130 may output a left eye image and a right eye image such that they have an output frequency of 120 Hz.

Figure 5:
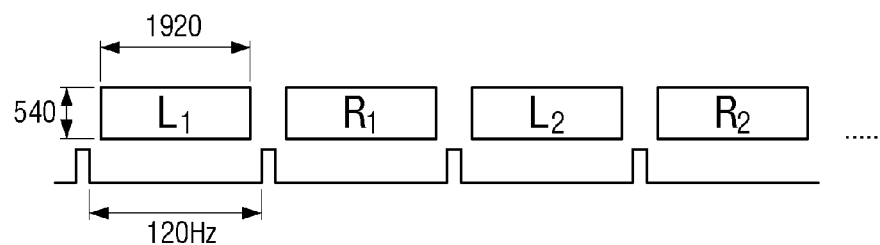
FIG. 5 is an output timing diagram of a left eye image and a right eye image according to an exemplary embodiment.

That is, the image output unit 130 may display a left eye image and a right eye image in resolution of 1920*540 alternately at an interval of 120 Hz as illustrated in FIG. 5. Specifically, the image output unit 130 may display in the order of a left eye image in resolution 1920*540 (L1)->a right eye image in resolution of 1920*540 (R1)->a left eye image in resolution of 1920*540 (L2)->a right eye image in resolution of 1920*540->....

Accordingly, a user may remove a flickering effect as the interval between a left eye image L1 and the next left eye image L2 becomes 60 Hz even if a timing controller of 60 Hz is used.

In addition, the image output unit 130 outputs pixel data of each line constituting a left eye image and a right eye image of which resolution is decreased to a positive number of lines simultaneously. For example, if resolution of a generated left eye image and a generated right eye image is decreased by half, the image output unit 130 outputs pixel data of each line constituting the left eye image and the right eye image to two lines at the same time. That is, the image output unit 130 outputs pixel data of each line constituting the left eye image and the right eye image of which resolution is reduced to 1920*540 to two lines simultaneously and thus, a user feels as if he or she is watching a left eye image and a right eye image having resolution of 1920*1080.

In addition, the image output unit 130 may be divided into a plurality of blocks and output the plurality of blocks at each frame of a left eye image and a right eye image under the control of the control unit 170. For example, if the image output unit 130 is divided into the first to fourth blocks, the image output unit 130 may output a left eye image L1 to the first to fourth blocks sequentially for $\frac{1}{120}$ seconds and a right eye image R1 to the first to fourth blocks sequentially for $\frac{1}{120}$ seconds. This prevents a cross-talk effect which occurs as a response speed differs at each location of the image output unit 130.

The user input unit 140 receives user manipulation from a user input device 140 such as a remote controller, and transmits the user manipulation to the control unit 170.

The sync signal generating unit 150 generates a sync signal to synchronize the display apparatus 100 with 3D glasses 200. Specifically, the sync signal generating unit 150 may generate a sync signal for turning only left eye glasses on when a left eye image is displayed on the display apparatus 100 so that the left eye image is viewed through the left eye glasses. In addition, the sync signal generating unit 150 may generate a sync signal for turning only right eye glasses on when a right eye image is displayed on the display apparatus 100 so that the right eye image is viewed through the right eye glasses.

Figure 6:
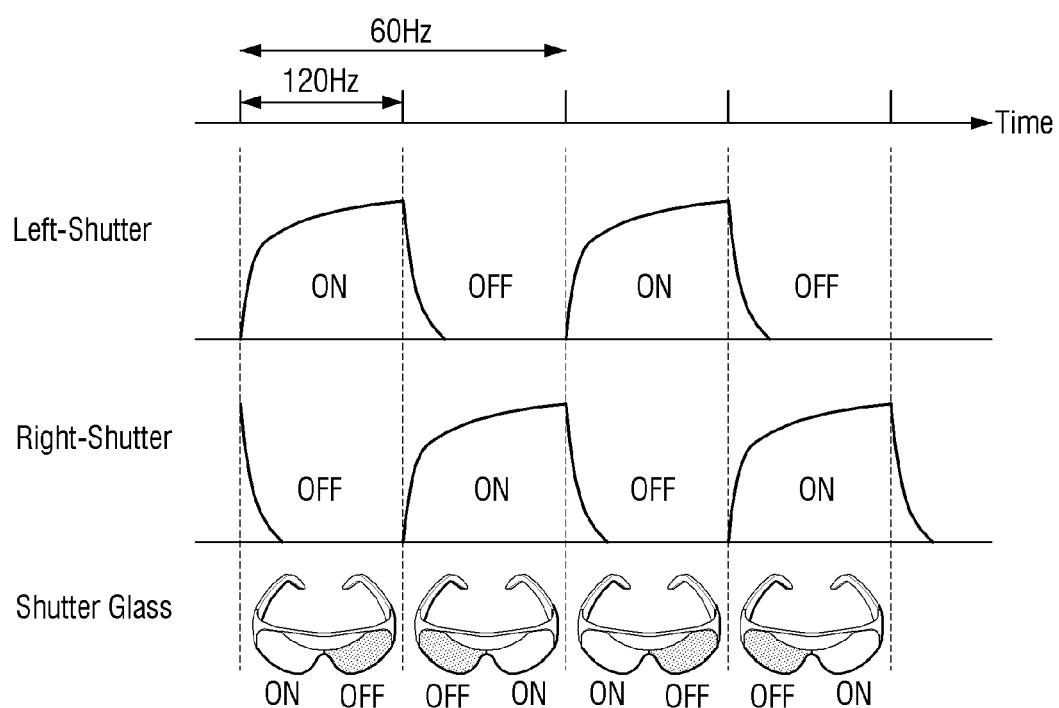
FIG. 6 is a view illustrating a sync signal to operate 3D glasses according to an exemplary embodiment.

In particular, when a left eye image and a right eye image of the display apparatus 100 is displayed alternately at an interval of 120 Hz, the sync signal generating unit 150 may also generate a sync signal at an interval of 120 Hz. That is, as illustrated in FIG. 6, the sync signal generating unit 150 may generate a sync signal for turning on left eye glasses for $\frac{1}{120}$ seconds and turning on right eye glasses for the next $\frac{1}{120}$ seconds.

The communication unit 160 may communicate with various external peripheral devices. In particular, the communication unit 160 may transmit a sync signal generated by the sync signal generating unit 150 to external 3D glasses 200.

The control unit 170 controls overall functions of the display apparatus 100 based on user manipulation received from the user input unit 160.

In addition, the control unit 170 may control the image processing unit 120 and the image output unit 130 to output a left eye image and a right eye image by decreasing resolution of a left eye image and a right eye image by a predetermined positive number of times and by increasing an output frequency of the left eye image and the right eye image before outputting them. For example, the control unit 170 may control the image processing unit 120 to reduce the resolution of a left eye image and a right eye image from 1920*1080 to 1920*540 and the image output unit 130 to output a left eye image and a right eye image by increasing the output frequency of a left eye image and a right eye image having the input frequency of 60 Hz by two times to 120 Hz.

In addition, the control unit 170 may control the image output unit 130 to output pixel data of each line constituting a left eye image and a right eye image to a positive number of lines simultaneously. For example, if resolution of a left eye image and a right eye image is decreased by half, the control unit 170 may control the image output unit 130 to output pixel data of each line constituting the left eye image and the right eye image to two lines at the same time. Therefore, even if the resolution of images is reduced by half, a user may enjoy an image having the same resolution of its original image.

In addition, the control unit 170 may control the image output unit 130 to divide the image output unit 130 into a plurality of blocks and output the plurality of blocks sequentially at each frame of a left eye image and a right eye image.

As described above, according to the display apparatus 100, a 60 Hz timing controller used for a general display apparatus may be used and thus, a flickering effect and a cross-talk effect may be prevented.

Hereinafter, a method for outputting a 3D image will be explained in greater detail with reference to FIG. 7. FIG. 7 is a flowchart to explain a method for outputting a 3D image of the display apparatus 100 according to an exemplary embodiment.

First of all, the display apparatus 100 receives an image from an external source (operation S710). In this case, the display apparatus 100 may receive a 2D image or a 3D image in various formats.

Subsequently, the display apparatus 100 generates a left eye image and a right eye image using the input image (operation S720). Specifically, if the input image is a 2D image, the display apparatus 100 may generate a left eye image and a right eye image based on the 2D image, and if the input image is a 3D image, the display apparatus 100 may divide the 3D image into a left eye image and a right eye image and generate a left eye image and a right eye image by scaling the size of the left eye image and the right eye image. In this case, the resolution of the generated left eye image and the right eye image may be 1920*1080.

The display apparatus 100 decreases the resolution of the generated left eye image and the generated right eye image by a predetermined number of times (operation S730). For example, if the resolution of the generated left eye image and the generated right eye image is 1920*1080, the display apparatus 100 may output the images by decreasing the resolution of the left eye image and the right eye image by two times to 1920*540.

In addition, the display apparatus 100 outputs a left eye image and a right eye image by increasing the reduced resolution of a left eye image and a right eye image by a positive number of times (operation S740). For example, if the resolution of a generated left eye image and a generated right eye image is reduced by two times, the display apparatus 100 may output the left eye image and the right eye image by increasing the resolution from 60 Hz to 120 Hz.

Further, the display apparatus 100 may output the pixel of each line constituting a left eye image and a right eye image to a positive number of lines simultaneously in order to compensate for reduced resolution. For example, if the resolution of a left eye image and a right eye image is decreased by half, the display apparatus 100 may output the pixel of each line constituting the left eye image and the right eye image to two lines at the same time.

As described above, according to the method of outputting a 3D image, a 60 Hz timing controller used for a general display apparatus may be used and thus, a flickering effect and a cross-talk effect may be prevented.

Meanwhile, in the above exemplary embodiment, the resolution of a generated left eye image and a generated right eye image is 1920*1080, but this is only exemplary. The exemplary embodiments may be applied to a left eye image and a right eye image having different resolutions.

Although a few exemplary embodiments have been shown and described, it would be appreciated by those skilled in the art that changes may be made in the exemplary embodiments without departing from the principles and spirit of the application, the scope of which is defined in the claims and their equivalents.

What is claimed is:

1. A method for outputting a three-dimensional (3D) image in a display apparatus, the method comprising:
generating a left eye image and a right eye image;
decreasing the left eye image's vertical resolution and the right eye image's vertical resolution by a predetermined positive number of times, wherein the positive number is an integer number equal to or greater than 2;
maintaining the left eye image's horizontal resolution and the right image's horizontal resolution; and
alternatively outputting the left eye image and the right eye image at an output frequency that is increased by the positive number of times while maintaining a timing controller's frequency,
wherein the outputting comprises outputting pixel data of each horizontal line constituting the left eye image to at least the positive number of horizontal lines of the left eye image simultaneously, and outputting pixel data of each horizontal line constituting the right eye image to at least the positive number of horizontal lines of the right eye image simultaneously.

2. The method as claimed in claim 1, wherein the positive number is 2.

3. The method as claimed in claim 2, wherein the resolution of the left eye image and the resolution of the right eye image is 1920*1080 and an input frequency is 60 Hz,
wherein the decreasing comprises decreasing the resolution of the left eye image and the resolution of the right eye image to 1920*540,
wherein the outputting comprises outputting the left eye image and the right eye image at an output frequency of 120 Hz and outputting pixel data of the each horizontal line constituting the left eye image and the right eye image to two horizontal lines simultaneously.

4. The method as claimed in claim 3, further comprising:
generating a sync signal of 120 Hz and transmitting the sync signal to 3D glasses interlocked with the display apparatus.

5. The method as claimed in claim 1, wherein the outputting comprises dividing an image output unit, which outputs the left eye image and the right eye image, into a plurality of blocks and outputting the plurality of blocks sequentially at every frame of the left eye image and every frame of the right eye image.

6. A display apparatus, comprising:
an image input interface which receives an image;
an image processor which generates a left eye image and a right eye image using the received image;
an image output unit which outputs the generated left eye image and the generated right eye image alternately, wherein the image output unit comprises a display; and
a controller which controls to output to the image output unit the left eye image and the right eye image by decreasing the left eye image's vertical resolution and the right eye image's vertical resolution by a predetermined positive number of times, by maintaining the left eye image's horizontal resolution and the right eye image's horizontal resolution, and by increasing an output frequency of the left eye image and an output frequency of the right eye image by the positive number of times while maintaining a timing controller's frequency, wherein the positive number is an integer number equal to or greater than 2,
wherein the controller controls the image output unit to output pixel data of each horizontal line constituting the left eye image to at least the positive number of horizontal lines of the left eye image simultaneously, and output pixel data of each horizontal line constituting the right eye image to at least the positive number of horizontal lines of the right eye image simultaneously.

7. The display apparatus as claimed in claim 6, wherein the positive number is 2.

8. The display apparatus as claimed in claim 7, wherein the resolution of the left eye image and the resolution of the right eye image is 1920*1080 and an input frequency is 60 Hz,
- wherein the controller controls the image output unit to decrease the resolution of the left eye image and the resolution of the right eye image to 1920*540, to output the left eye image and the right eye image at an output frequency of 120 Hz, and to output pixel data of the each horizontal line constituting the left eye image and the each horizontal line constituting the right eye image to two horizontal lines simultaneously.

9. The display apparatus as claimed in claim 8, further comprising:
- a sync signal generating unit which generates a sync signal of 120 Hz to synchronize with three-dimensional (3D) glasses interlocked with the display apparatus; and
- a communication unit which transmits the generated sync signal to the 3D glasses.

10. The display apparatus as claimed in claim 6, wherein the controller controls the image output unit to divide an image output unit into a plurality of blocks and output the plurality of blocks sequentially at every frame of the left eye image and every frame of the right eye image.

11. A method of outputting a three-dimensional (3D) image in a display apparatus, the method comprising:
- generating a left eye image and a right eye image;
- decreasing the left eye image's vertical resolution and the right eye image's vertical resolution by a predetermined number of times, wherein the predetermined number is 2;
- maintaining the left eye image's horizontal resolution and the right image's horizontal resolution; and
- alternatively outputting the left eye image and the right eye image at an output frequency that is increased by the predetermined number of times while maintaining a timing controller's 60 Hz frequency, and simultaneously outputting pixel data of each horizontal line constituting the left eye image and each horizontal line constituting the right eye image to at least two horizontal lines of the left eye image and at least two horizontal lines of the right eye image.

12. The method of claim 11, further comprising:
- generating a synchronization signal of 120 Hz and transmitting the synchronization signal to 3D glasses interlocked with the display apparatus.

* * * * *